(12) United States Patent
Britto et al.

(10) Patent No.: US 6,285,759 B1
(45) Date of Patent: *Sep. 4, 2001

(54) AUTOMATIC ANSWERING PICK-UP DEVICE

(75) Inventors: Susan J. Britto, Valley Springs; Eric K. Maxon, Ben Lomond; Michael T. Wise, Los Altos Hills, all of CA (US)

(73) Assignee: Hello Direct, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,963

(22) Filed: Apr. 28, 2000

Related U.S. Application Data

(63) Continuation of application No. 08/798,372, filed on Feb. 10, 1997, now Pat. No. 6,081,596.

(51) Int. Cl.⁷ .................................................. H04M 1/00
(52) U.S. Cl. .......................................................... 379/447
(58) Field of Search .................................. 379/447, 448, 379/428, 430, 425, 454

(56) References Cited

U.S. PATENT DOCUMENTS

| | | | |
|---|---|---|---|
| D. 358,594 | 5/1995 | Clour | D14/253 |
| 1,513,069 | 10/1924 | Reinbold | 179/81 R |
| 1,595,110 | 8/1926 | McGlade et al. . | |
| 2,310,032 | 2/1943 | Mathieson | 179/149 |
| 2,521,043 | 9/1950 | Citso | 179/147 |
| 2,961,498 | 11/1960 | Snow . | |
| 3,557,312 | 1/1971 | Vogelman et al. | 179/2 |
| 4,079,196 | 3/1978 | Spanel | 179/1 HS |
| 4,179,590 | 12/1979 | Snow | 179/156 A |
| 4,392,017 | 7/1983 | Torres | 179/1 HS |
| 4,453,043 | 6/1984 | Zielinski et al. | 179/90 BD |
| 4,484,029 | 11/1984 | Kenney | 179/2 EA |
| 5,694,467 | 12/1997 | Young, III | 379/430 |
| 5,758,289 | 5/1998 | Lipp et al. | 455/462 |
| 5,930,354 | * 7/1999 | Britto et al. | 379/447 |
| 6,081,596 | * 6/2000 | Britto et al. | 379/447 |

FOREIGN PATENT DOCUMENTS

| | | | |
|---|---|---|---|
| 509713 | 6/1971 | (CH) | H04M/1/64 |
| 29 21 941 | 12/1980 | (DE) | H04M/1/64 |
| 0 680 188 A2 | 11/1995 | (EP) | H04M/1/72 |

* cited by examiner

*Primary Examiner*—Jack Chiang
(74) *Attorney, Agent, or Firm*—Haverstock & Owens LLP

(57) ABSTRACT

A cordless telephone headset and remotely controlled telephone handset pick-up device for use in conjunction with an existing corded telephone set. A mechanical lift arm of the pick-up device, driven by an electric motor with a slip clutch, lifts the handset away from the corded telephone cradle, placing the telephone handset in an off-hook position. The handset is lowered back onto the cradle by the mechanical lift arm, returning the telephone set to an on-hook position. The mechanical lift arm is activated and deactivated in response to a radio signal indicative of the lowering and raising of the microphone boom of the cordless headset. The slip clutch provides sufficient force to gently and reliably raise and lower the telephone handset without causing misalignment between the handset and the cradle and without causing damage. As the handset is gently lowered over the hook switch, the motor drives the lift arm downward beyond a point at which the handset is expected to be lowered into the cradle, ensuring that the telephone is reliably placed on-hook, while the slip clutch limits the amount of force that can be applied to the telephone set. The telephone set rests upon a platform coupled to the lift-arm, providing a unitary structure for the telephone set and handset pick-up device which aids in maintaining proper alignment of the handset to the cradle by preventing the lift arm from forcing the pick-up device out alignment.

28 Claims, 9 Drawing Sheets

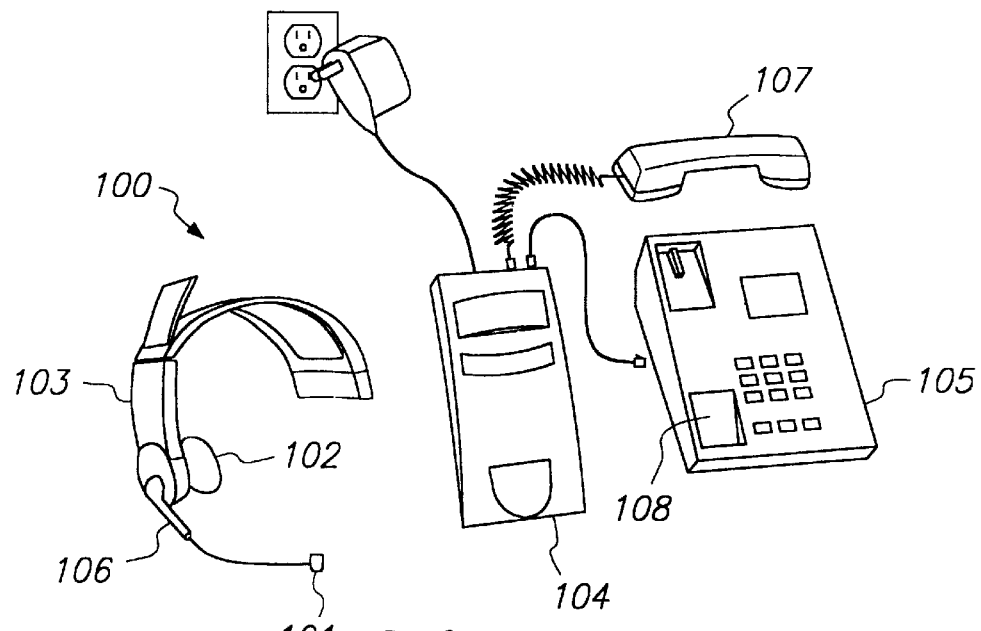
FIG. 1
(PRIOR ART)
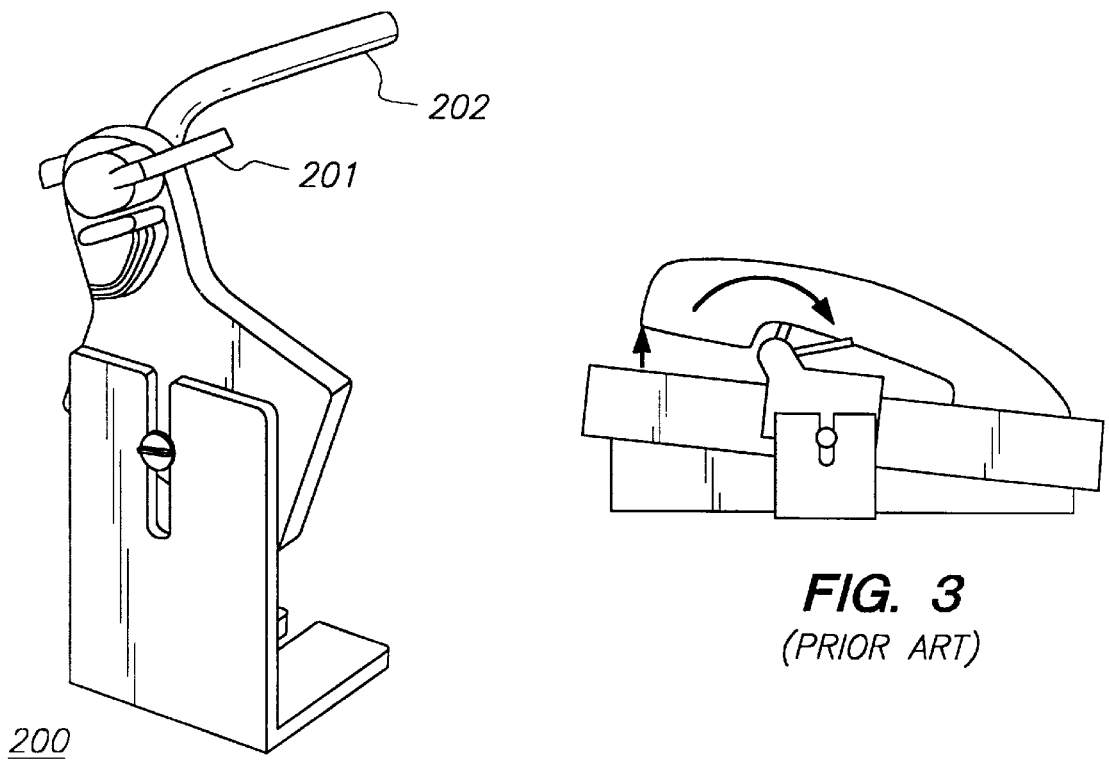
FIG. 2
(PRIOR ART)
FIG. 3
(PRIOR ART)

| FIG. 8a | FIG. 8b |

AUTOMATIC ANSWERING PICK-UP DEVICE

RELATED APPLICATIONS

This application is a continuation application of application of Ser. No. 08/798,372 filed Feb. 10, 1997 now U.S. Pat. No. 6,081,596 and claims priority therefrom.

FIELD OF THE INVENTION

This invention relates to the field of telephones. More particularly, this invention relates to the field of automatic telephone handset pick-up devices.

BACKGROUND OF THE INVENTION

Since the advent of the telephone, a variety of accessories have been developed for making telephone usage more convenient and for meeting various needs of telephone users. Among these accessories are cordless telephones. Cordless telephones generally include a base unit and a cordless handset or a headset. The base unit is typically coupled to a telephone wall jack or to an existing corded telephone set and includes a radio transceiver for transmitting and receiving signals between the base unit and the handset or headset.

Contemporary cordless handsets offer users most, if not all, of the operational features currently associated with conventional corded telephones. This includes notification of an incoming call, an ability to answer the call, to initiate a call, dial a number, to converse with the other party, and to terminate the call by hanging-up. This allows a user to rely solely on the cordless handset for all operational features of the telephone. Cordless handsets, however, like corded handsets, require that the user occupy one hand with the handset or require that the user cradle the handset between the user's shoulder and ear.

Cordless telephone headsets have emerged as another popular telephone accessory. The cordless headset is worn by the user and typically incorporates a microphone boom, a microphone, a speaker and a transceiver housed within the headset which allow the headset to communicate directly with a base unit. As such, cordless headsets allow the user to converse with another party while having both hands free and while having freedom of movement within the range of the transceiver.

Headsets, cordless and corded, however, only replace the functionality of a handset and do not include all the functions of a telephone. For example, headsets are generally not configured to initiate a call, to dial a number or to answer an incoming call. As such, cordless headsets typically do not provide an ability to control the base unit to go off-hook for receiving an incoming call or to go on-hook to hang-up the call at the end of a conversation. Thus, their utility is limited in that the user must be stationed near the existing corded telephone set to answer an incoming call. Only after the call has been answered can the user walk freely away while continuing the conversation. The user must again return to the existing corded telephone set to terminate the call by hanging up.

Cordless headsets are often provided as an after-market add-on for an existing telephone. As such, a cordless headset from one source or manufacturer can generally be used with telephones from a variety of sources or manufacturers. An example of a prior art cordless headset 100 is illustrated in FIG. 1. Headsets identical or similar to the headset 100 can be obtained from Hello Direct, Inc, located at 5893 Rue Ferrari, in San Jose, Calif. or by calling Hello Direct, Inc. at 1(800)444-3556.

The headset 100 includes a microphone 101, a receiver speaker 102 and a transceiver 103. The headset 100 is designed to allow hands free telephone conversations once a call is established. The headset 100 communicates via radio frequency signals with a base unit 104 which is coupled to the handset port of an existing telephone 105. A battery powered radio transceiver 103 is included in the headset 100. In operation, battery power is removed from the headset 100 when the microphone boom 106 is rotated upwards such that it is approximately perpendicular to the ground. When the boom 106 is rotated downward, battery power is applied to the headset 100 such that the user is able to converse with another party over the telephone. The headset 100 is designed so that it can be configured for use with an existing telephone 105. Thus, to install the base unit 104, the base unit 104 is electrically coupled to the telephone handset port. The handset 107 is disconnected from the handset port of the telephone 105 and reconnected to an appropriate port of the base unit 104. The headset 100 and the handset 107 can be used interchangeably, but not at the same time.

To place or answer a call, the user must remove the handset 107 from the cradle 108. FIGS. 2 and 3 illustrate a prior art device for mechanically raising a telephone handset off-hook The device illustrated in FIGS. 2 and 3 is currently available from Hello Direct, Inc., under the name TOUCH-N-TALK™ and is the subject of U.S. Pat. No. D358,594. By rotating a lever 201, a bar 202 engages the handset 107 and lifts the handset 107 from the cradle 108, thus placing the telephone off-hook. Rotating the lever 201 in the opposite direction replaces the handset 107 on the cradle 108, placing the telephone on-hook. Therefore, this device allows a user to manually answer and hang-up calls without having to fully remove the handset 107 from the cradle 108. The device illustrated in FIGS. 2 and 3 has a drawback in that the user must be in a position to manually lift the handset from the cradle in order to answer and to terminate a call.

FIG. 4 illustrates a prior art hook switch On/Off device described in European Patent Application No. EP 680,188. When an On/Off control signal is applied to a XOR gate 401, a driving motor 401 starts rotation of gears 402, 403 and semi-circular gear 404. Rotation of the gear 404 causes a member 104b to rise relative to a member 405, lifting a telephone handset from its hook switch. When the separating member 104b rises sufficiently, a sensor 407 signals the motor 401 to stop. When the On/Off control signal indicates the call is over, the motor 401 rotates the gear 404 until the gear 404 no longer engages the member 104b. This causes the member 104b to fall, dropping the handset onto the hook switch. The sensor 407 then signals the motor 401 to stop. This device has a drawback in that repeatedly dropping the telephone handset onto the hook switch of the telephone may eventually damage the handset, the hook switch or the telephone. In addition, the handset may become misaligned from the member 104b or from the cradle such that the handset may not land directly on the hook switch, causing the hook switch to remain off hook. Failure to properly hang up after a telephone call can result in unnecessary telephone charges, while later callers can receive a busy signal. Also, the linear lift mechanism and mechanical configuration of the commercial embodiment of this device allow it to be readily configured to only a limited number of commercially available telephone sets.

What is needed is a device that will notify a headset user of an incoming call and that will allow the user to reliably answer calls and to hang-up the calls from a remote location using the cordless headset. What is further needed is a device of the aforementioned type that is compatible with existing telephone units.

SUMMARY OF THE INVENTION

The invention is a cordless telephone headset and remotely controlled telephone handset pick-up device adapted for use in conjunction with an existing corded telephone set. A base unit is electrically coupled to the handset port of the corded telephone, while the handset of the corded telephone is electrically coupled to the base unit. The base unit communicates with the headset via radio signals. A mechanical lift arm of the pick-up device, driven by an electric motor with a slip clutch, lifts the handset away from the corded telephone cradle, placing the telephone handset in an off-hook position. From the off-hook position, the handset is lowered back down onto the cradle by the mechanical lift arm, returning the telephone set to arivn-hook position. The mechanical lift arm is activated and deactivated in response to a radio signal indicative of the lowering and raising of the microphone boom of the cordless headset.

The slip clutch provides sufficient force to gently and reliably raise and lower the telephone handset without causing misalignment between the handset and the cradle and without causing damage to the handset, the hook switch or to the telephone set. As the handset is gently lowered over the hook switch, the motor drives the lift arm downward beyond a point at which the handset is expected to be lowered into the cradle to ensure that the telephone is reliably placed on-hook, while the slip clutch limits the amount of force that can be applied to the telephone set. In other words, the duration of time the device lowers the handset is longer than for raising the handset to ensure that the handset is fully replace on the cradle.

The telephone set rests upon a platform coupled to the lift-arm. This arrangement provides a unitary structure for the telephone set and handset pick-up device which aids in maintaining proper alignment of the handset to the cradle by preventing the lift arm from forcing the pick-up device out alignment when the lift arm picks up the handset and when the clutch slips against the telephone. The lift arm rotates about a pivoting axis. The length of the arm is variable to accommodate a variety of telephone configurations. Additionally, the use of this unitary structure in combination with the rotating lift arm allow this device to be used with a very wide variety of commercially available telephone sets.

A microphone and a sensor are positioned to sense when the corded telephone is ringing. When it is determined that the corded telephone is ringing, a signal is transmitted to the cordless headset to alert the user of the incoming call. To answer the call from the cordless headset, the user lowers the microphone boom of the headset into an in-use position, thereby causing the headset to signal the base unit to go off-hook. The base unit then causes the mechanical lift arm to raise the handset from its cradle. When the handset is raised from the cradle, the telephone is off-hook and the incoming call is coupled to the cordless headset. The user can then converse with the caller. To terminate the call, the user raises the microphone boom of the headset into a standby position, thereby causing the headset to signal the base unit to go on-hook, causing the mechanical lift arm to lower the handset back into the cradle, terminating the call. When the handset is in the cradle, the telephone is on:hook and is again ready to accept incoming calls.

In this manner, incoming calls can be reliably answered and terminated using the cordless headset, even when the user is at a remote location away from the corded telephone set. If desired, the handset of the corded telephone can be used to communicate over the telephone line when the user is located near the corded telephone set.

BRIEF DESCRIPTION OF THE DRAWINGS

FIG. 1 illustrates a prior art headset system coupled to a conventional telephone.

FIG. 2 illustrates a prior art mechanical device for raising a telephone handset off-hook.

FIG. 3 illustrates the prior art device illustrated in FIG. 2 coupled to a conventional telephone.

DETAILED DESCRIPTION OF THE PREFERRED EMBODIMENT

Figure 4:
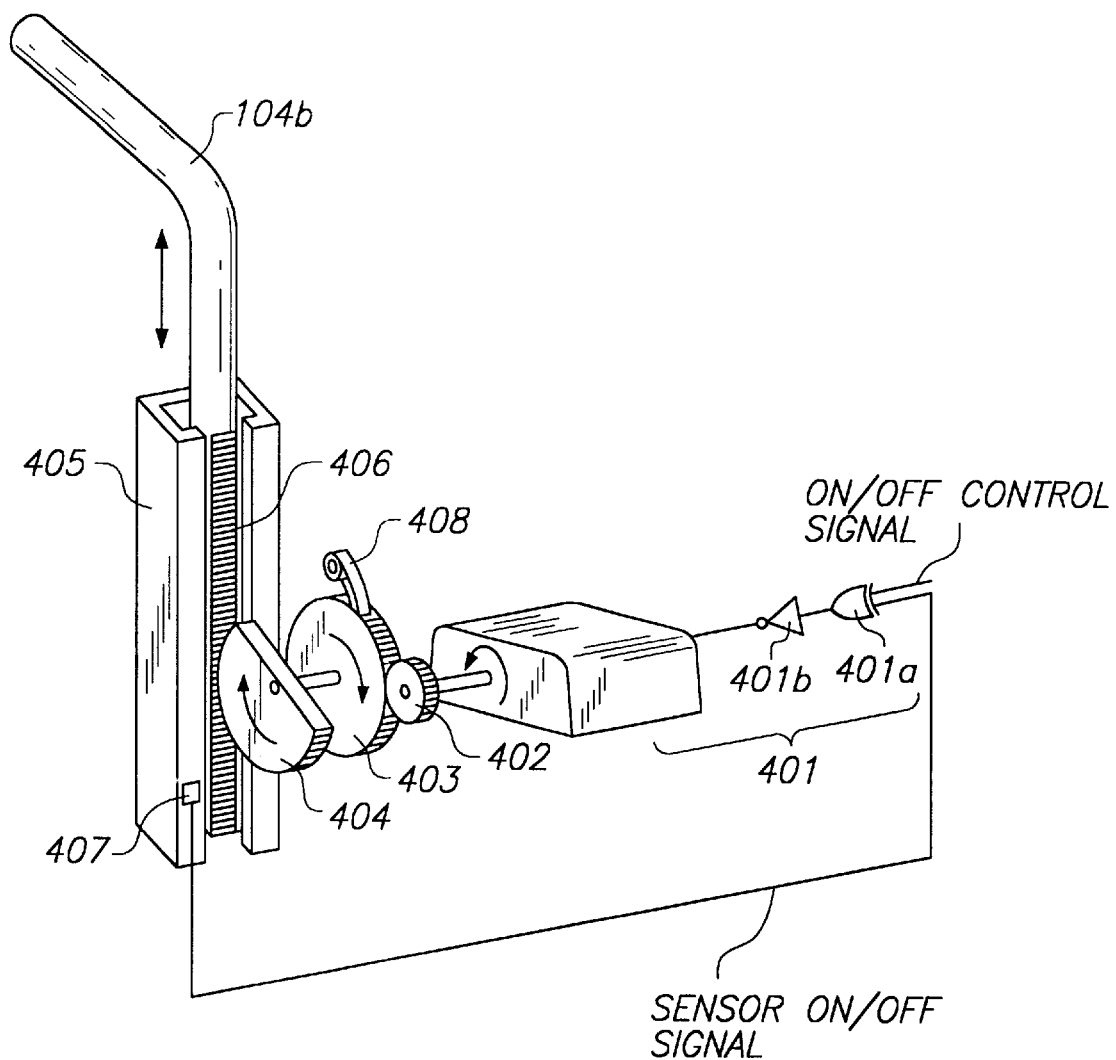
FIG. 4 illustrates a prior art hook switch On/Off device.
Figure 5:
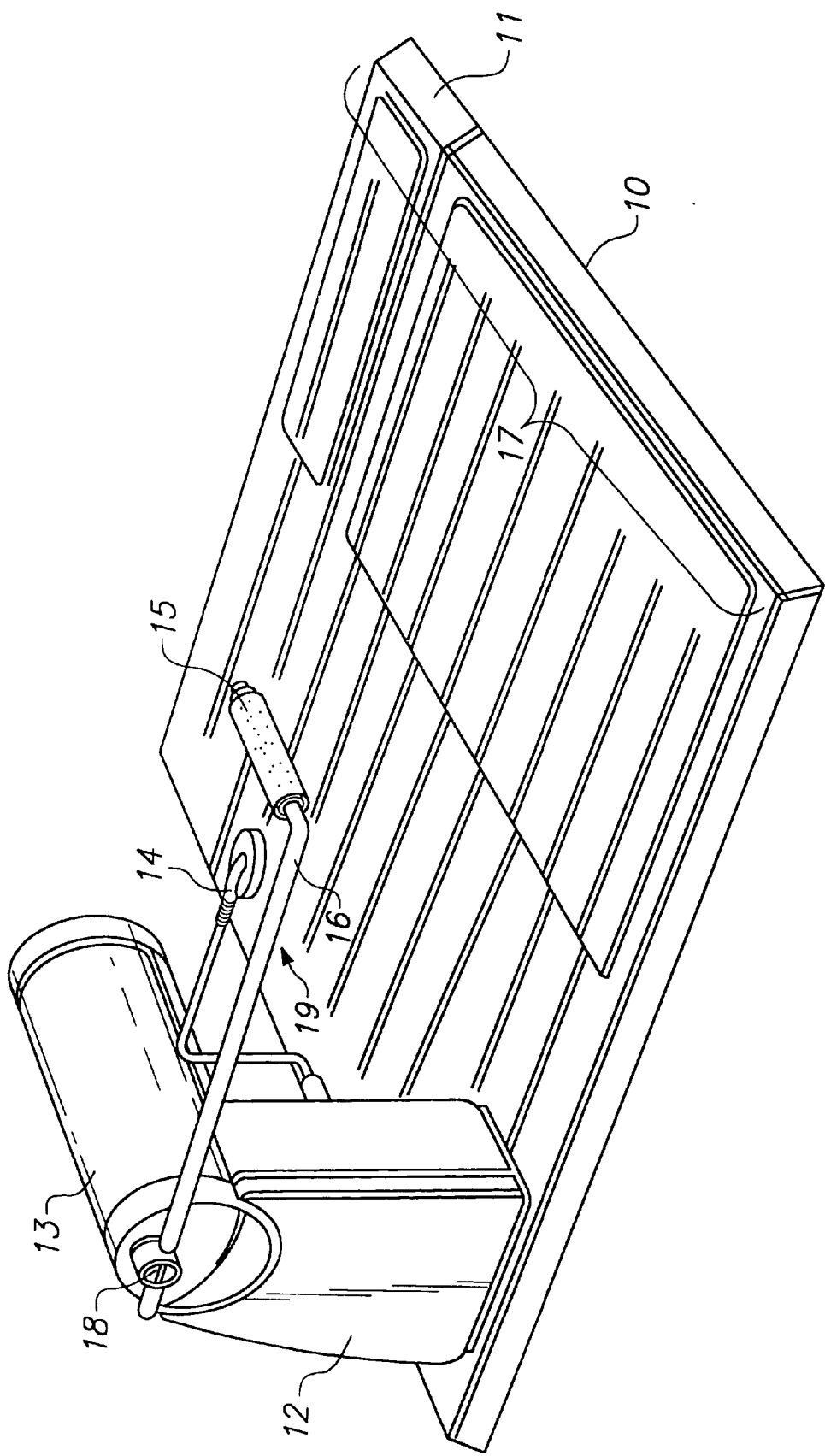
FIG. 5 illustrates a perspective view of the present invention.

FIG. 5 illustrates a perspective view of the present invention. A main stand 10 and an outer stand 11 comprise a platform 17 of the invention. The platform 17 is designed to have a corded telephone unit (not shown) rest on top of the platform 17 to ensure that the corded telephone will remain correctly positioned relative to the present invention. Further, with the corded telephone unit resting on top of the platform 17, the present invention and the corded telephone unit are coupled together such that they act as a single structural unit.

The main stand 10 and the outer stand 11 are preferably separable. Multiple outer stands 11 can be coupled to this construction to accommodate wider telephone sets. It will be apparent, however, that other means can be provided for adjusting the size of the platform 17.

A pedestal unit 12 is coupled to the platform 17. A microphone 14 is coupled to the pedestal unit 12. The pedestal unit 12 offers structural support for a motor housing 13 and also serves as a housing for control circuits. A handset shaft 16 is coupled between a drive shaft 18 and a handset arm 15. Together, the handset shaft 16 and handset arm 15 comprise a lift-arm 19. The length of the lift-arm 19 is adjustable to be variable which allows the present invention to accommodate a variety of telephone configurations. The handset arm 15 can be padded to protect the corded telephone handset (not shown). Preferably, the padding also prevents the handset from shifting its position relative to the lift-arm 19 at times when the handset is lifted by the lift-arm 19.

Figure 6:
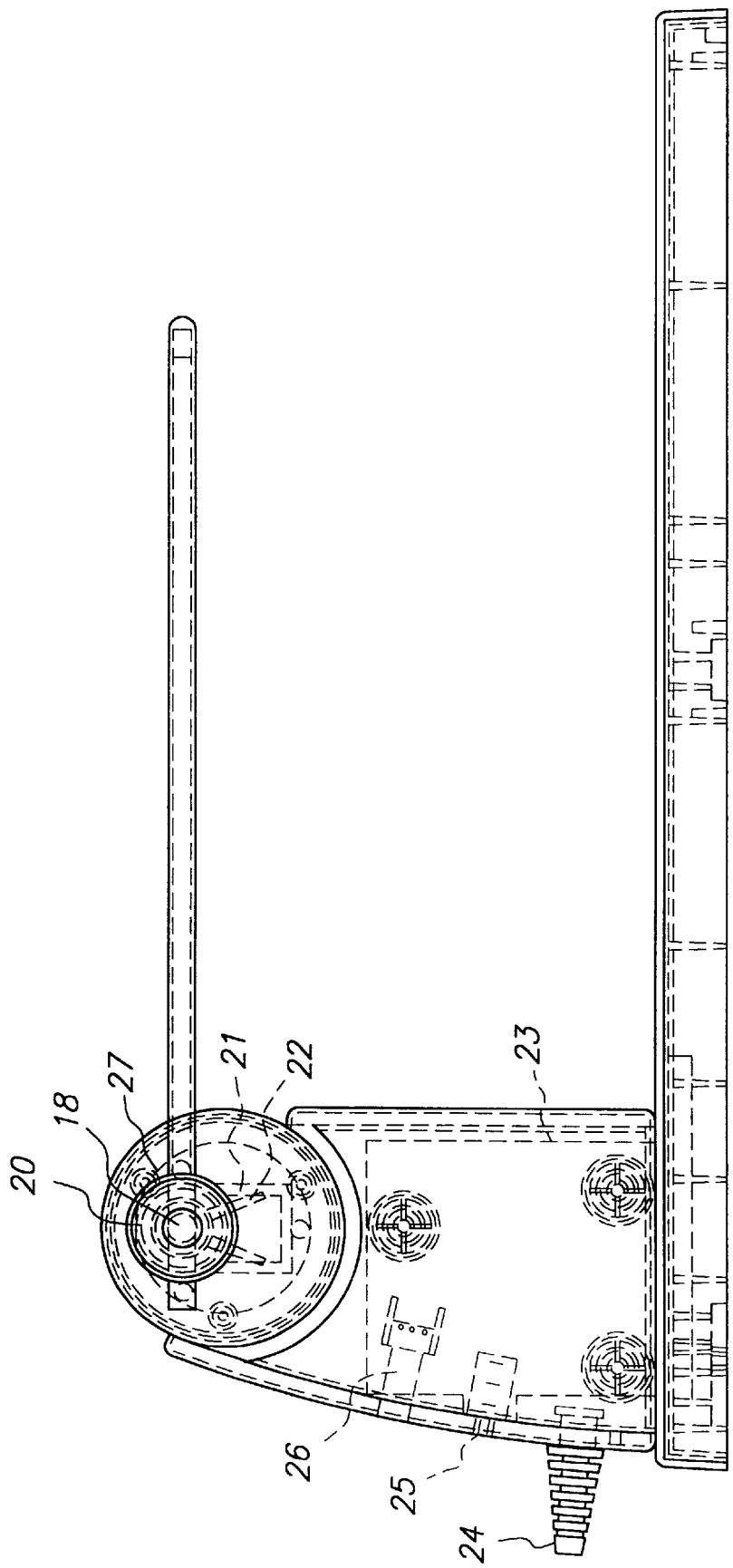
FIG. 6 illustrates a side view of the present invention.

FIG. 6 illustrates a side cut-away view of the present invention which highlights elements of the pedestal unit 12. The drive shaft 18 is surrounded by motor shaft bushings 20. The motor shaft bushings 20 keep the handset shaft 16 properly aligned. A clutch housing 21 contains a clutch band mechanism 22. The clutch band mechanism 22 is coupled to the drive shaft 20 and the handset shaft 16. The clutch band mechanism transfers the energy from the motor 27 to the drive shaft 18. The amount for force that the motor 27 can apply to the drive shaft 18 is selectively limited by the amount of force generated by the clutch band mechanism 22. Accordingly, the clutch band mechanism 22 prevents the motor 27 from over-straining when the handset shaft 16 has reached a furthermost downward position or when the handset shaft 16 contacts an unexpected obstacle while the motor is still running.

A height adjustable potentiometer 26 allows the user to adjust the pick up height that the present invention lifts the corded telephone handset. The height adjustability makes the invention easily adaptable to a wide variety of corded phones. By minimizing the height to which the handset is lifted, the opportunity for misalignment of the handset to the telephone hook switch will be reduced as the handset will be less likely to shift its position relative to the handset arm 15. A PC board 23 houses the circuitry for detecting a ring and controlling the motor 27. A microphone input 25 provides the present invention with a telephone ring detection input signal and is coupled to the PC board 23. The port 24 provides the signal to the cordless headset and likewise, receives a signal from the cordless headset. The port 24 serves as the communications port which links the present invention to the cordless headset.

Figure 7:
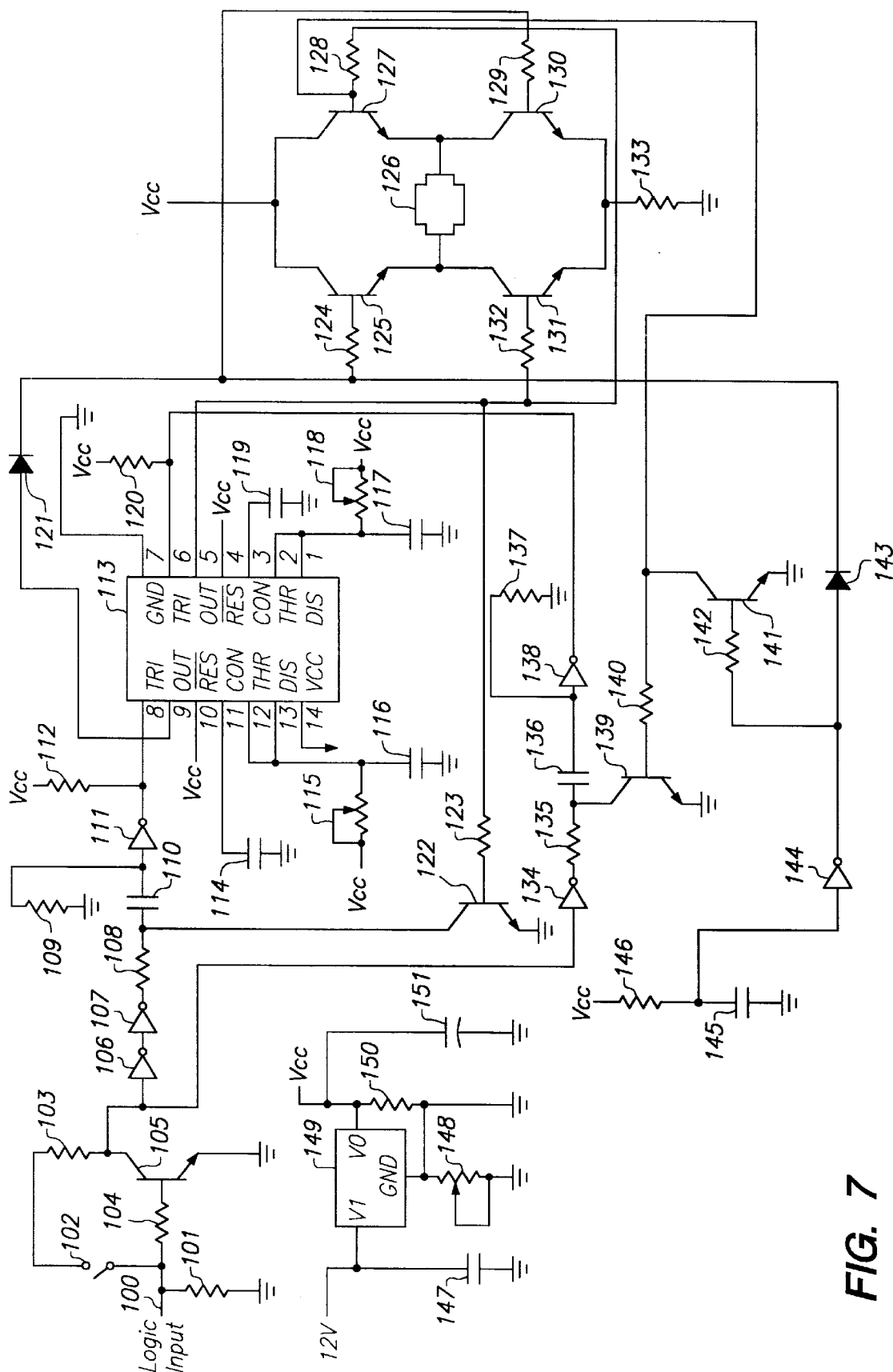
FIG. 7 illustrates a detailed schematic of the motor control circuit.

FIG. 7 illustrates a detailed schematic of a circuit for controlling the motor which is implemented on the PC board 23 of FIG. 6. It will be apparent that other circuits can be readily designed and implemented to control the motor. A logic input is entered on line 100. Line 100 is coupled to a first terminal of a resistor 101 (100 k ohms), a first terminal of a switch 102, and a first terminal of a resistor 104 (100 k ohms). A second terminal of the resistor 101 is coupled to the ground. A second terminal of the switch 102 is coupled to a first terminal of a resistor 103 (100 k ohms). A second terminal of the resistor 104 is coupled to a base terminal of an npn transistor 105 (2N4401). An emitter terminal of the transistor 105 is coupled to the ground. A collector terminal of the transistor 105 is coupled to a second terminal of the resistor 103, an input terminal of an inverter 106 (4049), and an input terminal of an inverter 134 (4049).

An output terminal of the inverter 106 is coupled to an input terminal of an inverter 107 (4049). An output terminal of the inverter 107 is coupled to a first terminal of a resistor 108 (10 k ohms). A second terminal of the resistor 108 is coupled to a first terminal of a capacitor 110 (0.1 $\mu$F ) and a collector terminal of an npn transistor 122 (2N4401). A second terminal of the capacitor 110 is coupled to an input terminal of an inverter 111 (4049) and a first terminal of a resistor 109 (1M ohms). A second terminal of the resistor 109 and an emitter terminal of the transistor 122 are coupled to the ground. An output terminal of the inverter 111 is coupled to a first terminal of a resistor 112 (10 k ohns) and pin 8 of a chip 113.

The chip 113 is preferably part number LH556 and provides the circuit in the FIG. 7 with proper control signals to operate the motor 126. It will be apparent that other motor control circuits can be utilized. Pin 9 of the chip 113 is coupled to an anode terminal of a diode 121 (1N4140). Pin 10 of the chip 113 is coupled to the power supply VCC. Pin 11 of the chip 113 is coupled to a positive terminal of a capacitor 114 (0.1 $\mu$F), and a negative terminal of the capacitor 114 is coupled to the ground. Pins 12 and 13 of the chip 113 are coupled to a positive terminal of the capacitor 116 and a first terminal of a variable resistor 115. A second terminal of the variable resistor 115 is coupled to the VCC, and a negative terminal of the capacitor 116 is coupled to the ground. Pins 4 and 14 of the chip 113 are coupled to the VCC, and pin 7 of the chip 113 is coupled to the ground. Pin 6 of the chip 113 is coupled to a first terminal of a resistor 120 (10 k olms) and an output terminal of the inverter 138 (4049).

A second terminal of the resistor 120 is coupled to the VCC. Pin 5 of the chip 113 is coupled to a first terminal of a resistor 123 (10 k ohms), a first terminal of a resistor 132 (10 k ohms), and a first terminal of a resistor 128 (10 k ohms). Pin 3 of the chip 113 is coupled to a positive terminal of a capacitor 119 (0.1 $\mu$F), and a negative terminal of the capacitor 119 is coupled to the ground. Pins 1 and 2 of the chip 113 are coupled to a positive terminal of a capacitor 117 (33 $\mu$F) and a first terminal of a variable resistor 118. A second terminal of the variable resistor 118 is coupled to the VCC, and a negative terminal of the capacitor 117 is coupled to the ground. A second terminal of the resistor 124 is coupled to a base terminal of the transistor 122.

A cathode terminal of the diode 121 is coupled to a first terminal of a resistor 129 (10 k ohms), a first terminal of a resistor 124 (10 k ohms), and a cathode terminal of a diode 143 (1N4140). The second terminals of the resistors 124, 132, 128, and 129 are coupled to the base terminals of the tristors 125, 131, 127, and 130, respectively. The collector terminals of the transistors 125 and 127 are coupled to the VCC. The emitter terminals of the transistors 131 and 130 are coupled to a first terminal of a resistor 133. A second terminal of the resistor 133 is coupled to the ground. An emitter terminal of the transistor 125 and a collector terminal of the transistor 131 are coupled to a first terminal of the motor 126. An emitter terminal of the transistor 127 and a collector terminal of the transistor 130 are coupled to a second terminal of the motor 126.

An output terminal of the inverter 134 is coupled to a first terminal of a resistor 135 (10 k ohms). A second terminal of the resistor 135 is coupled to a collector terminal of the transistor 139 and a first terminal of a capacitor 136 (0.1 $\mu$F). A second terminal of the capacitor 136 is coupled to an input terminal of an inverter 138 and a first terminal of a resistor 137 (1M ohm). A second terminal of the resistor 137 is coupled to the ground A base terminal of the transistor 139 is coupled to a first terminal of a resistor 140 (10 k ohms), and an emitter terminal of the transistor 139 is coupled to the ground. A second terminal of the resistor 140 is coupled to a base terminal of the transistor 127 and a collector terminal of the transsor 141. A base terminal of the transistor 141 is coupled to a first terminal of the resistor 142, and an emitter terminal of the transistor 141 is coupled to the ground. A second terminal of the resistor 142 is coupled an anode terminal of the diode 143 and an output terminal of the inverter 144. An input terminal of the inverter 144 is coupled to a first terminal of a resistor 146 (1M ohm) and a positive terminal of a capacitor 145 (2.2 $\mu$F). A negative terminal of the capacitor 145 is coupled to the ground, and a second terminal of the resistor 146 is coupled to the VCC.

Figures 8, 8A:
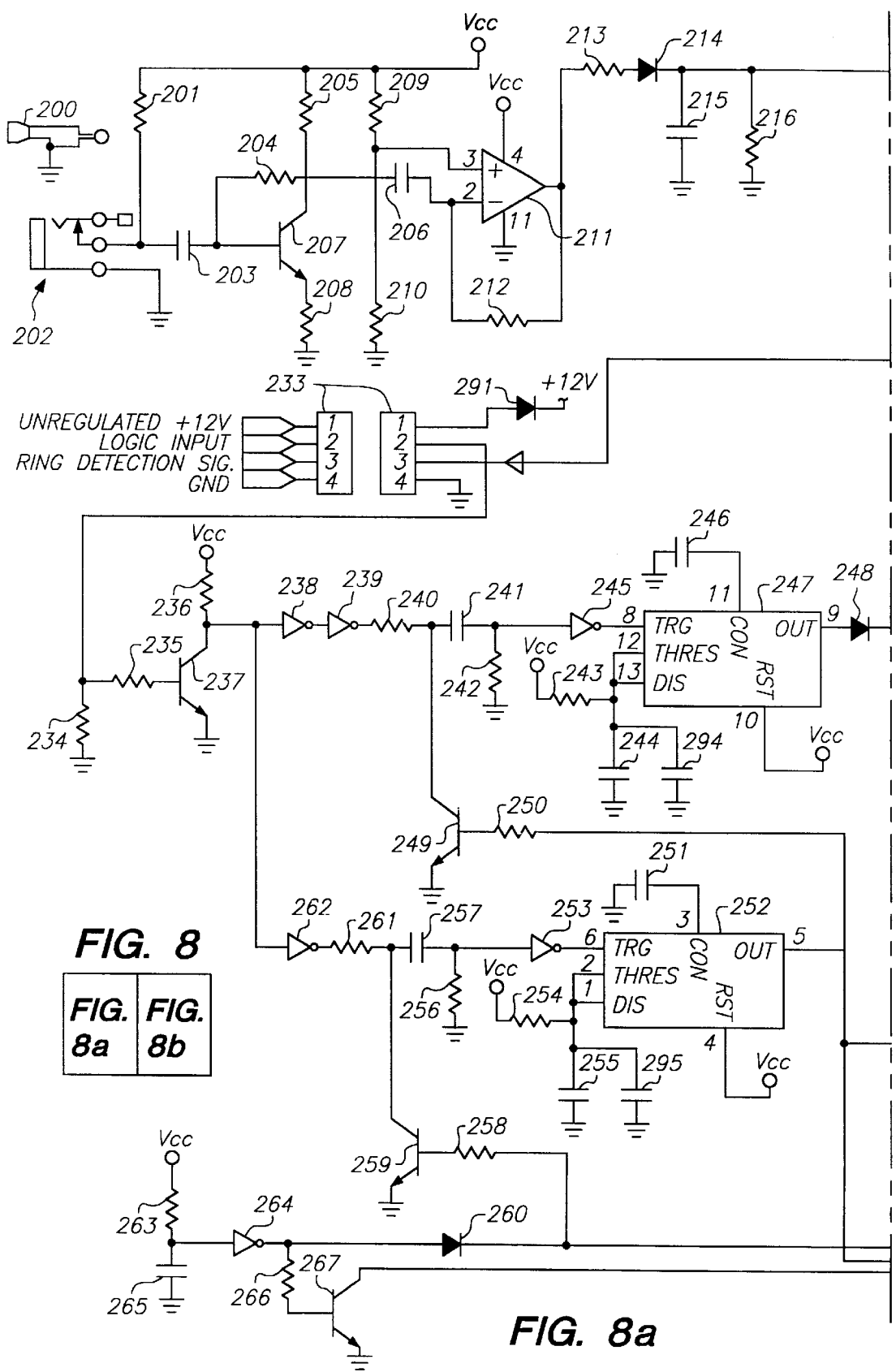
FIG. 8 illustrates a detailed schematic of the motor control circuit and the microphone preamplifier circuit
Figure 8B:
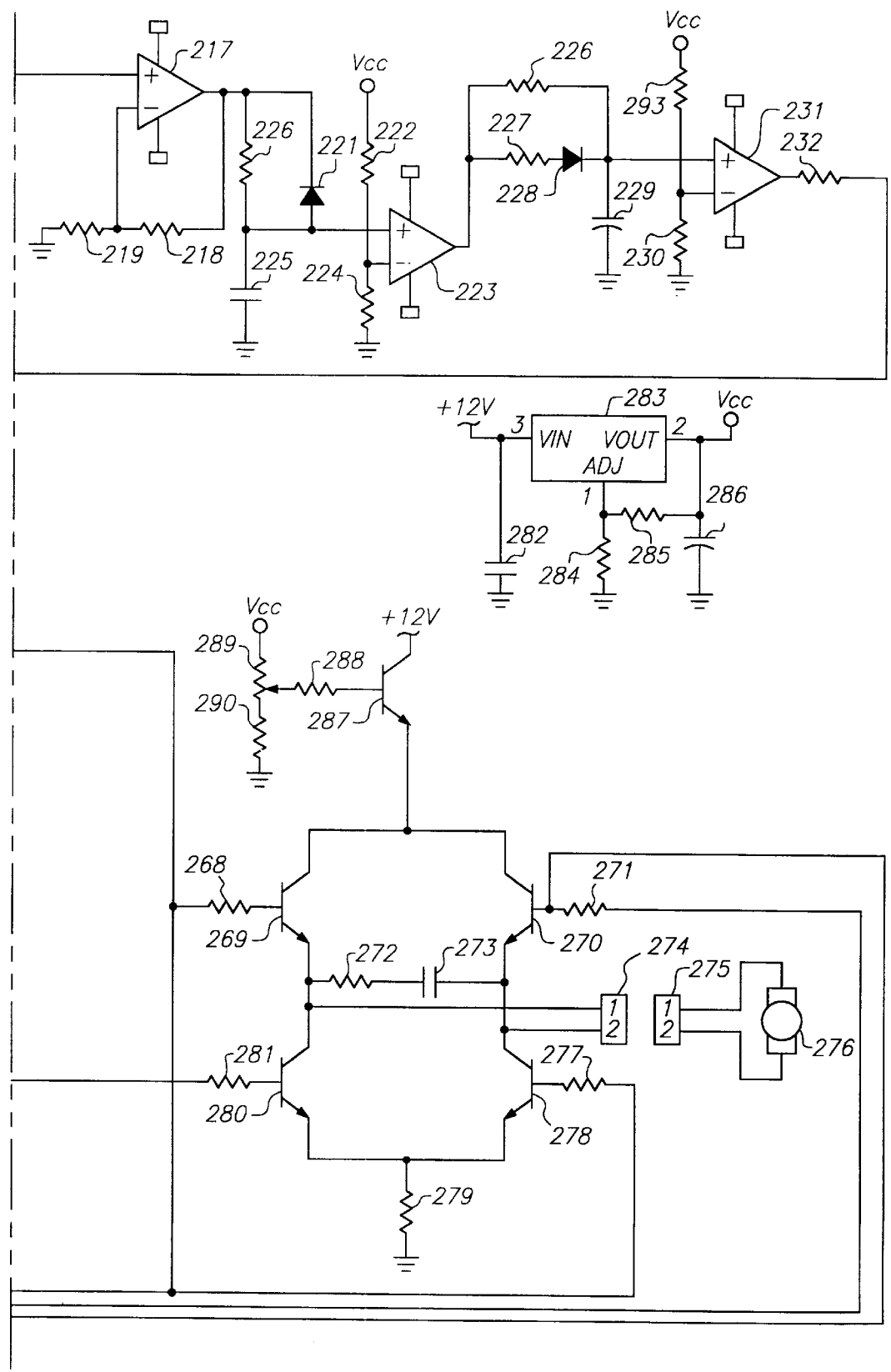

FIG. 8 illustrates a detailed schematic of the motor controller circuit and the microphone preamplifier circuit which is implemented on the PC board 23 of FIG. 6. A contact microphone 200 is coupled to a preamplifier circuit which filters and amplifies certain frequencies such that an input signal can be distinguished between a telephone ring and other extraneous sounds. The contact microphone 200 is coupled to a jack plug 202. The 2.5 mm jack plug 202 has a first terminal coupled to the ground. A second terminal of the jack plug 202 is coupled to a first terminal of a resistor 201 (2.2 k ohms) and a first terminal of a capacitor 203. A second terminal of the resistor 201 is coupled to a first terminal of a resistor 204 (10 k ohms), a first terminal of a resistor 209 (180 k ohms), and 8.8 volts dc. A second terminal of the capacitor 203 is coupled to a base terminal of an npn transistor 207 (2N4401) and a first terminal of a resistor 204 (820 k ohms).

A second terminal of the resistor 204 is coupled to a second terminal of the resistor 205, a first terminal of a capacitor 206, and a collector terminal of the transistor 207. A emitter terminal of the transistor 207 is coupled to a first terminal of a resistor 208 (510 k ohms). A second terminal of the resistor 208 is coupled to the ground. A second terminal of the capacitor 206 is coupled to a second terminal of the resistor 209, a first terminal of a resistor 210 (22 k ohms), and a V+ terminal of an operational amplifier 211 (LM324). A second terminal of the resistor 210 is coupled to the ground. Pin 4 of the operational amplifier 211 is biased to 8.8 volts dc, and pin 11 is coupled to the ground. A V− terminal of the operational amplifier 211 is coupled to a first terminal of a resistor 212 (1M ohm). A second terminal of the resistor 212 is coupled an output terminal of the operational amplifier 211 and a first terminal of a resistor 213 (10 k ohms).

A second terminal of the resistor 213 is coupled to an anode terminal of a diode 214 (1N4148). A cathode terminal of the diode 214 is coupled to a positive terminal of a capacitor 215 (2.2 μF), a first terminal of a resistor 216 (220 k ohms), and a V+ terminal of an operational amplifier 217 (LM324). A V− terminal of the operational amplifier 217 is coupled to a first terminal of a resistor 219 and a first terminal of a resistor 281 (34 k ohms). A second terminal of the resistor 219 is coupled to the ground, and a second terminal of the resistor 218 is coupled to an output terminal of the operational amplifier 217, a first terminal of a resistor 220 (1M ohm), and a cathode terminal of a diode 221 (1N4148). A second terminal of the cresistor 220 is coupled to an anode terminal of the diode 221, a positive terminal of a capacitor 225 (2.2 μF), a first terminal of a resistor 222 (56 k ohms), and a V+ terminal of an operational amplifier 223 (LM324). Negative terminals of the capacitor 225 and the capacitor 215 are coupled to the ground. A second terminal of the resistor 222 is coupled to 8.8 volts dc. A V− terminal of the operational amplifier 223 is coupled to a first terminal of a resistor 224 (90 k ohms), and a second terminal of the resistor 224 is coupled to the ground. An output terminal of the operational amplifier 223 is coupled to a first terminal of a resistor 226 (1M ohm) and a first terminal of a resistor 227 (1M ohm).

A second terminal of the resistor 227 is coupled to an anode terminal of a diode 228 (1N4148). A second terminal of the diode 228 is coupled to a second terminal of the resistor 226, a positive terminal of a capacitor 229 (1 μF), and a V+ terminal of an operational amplifier 231 (LM324). A negative terminal of the capacitor 229 is coupled to the ground. A V− terminal of the operational amplifier 231 is coupled to a first terminal of a resistor 293 (27 k ohms) and a first terminal of a resistor 230 (100 k ohms). A second terminal of the resistor 293 is coupled to 8.8 volts dc, and a second terminal of the resistor 230 is coupled to the ground. An output terminal of the operational amplifier 231 is coupled to a first terminal of a resistor 232 (1 k ohm). A second terminal of the resistor 232 is coupled to a ring detection signal module on a third terminal of a jumper switch 233. A first terminal of the jumper switch 233 is coupled to an anode terminal of a diode 291. A cathode terminal of the diode 291 is coupled to a 12 volt unregulated power source. A fourth terminal of the jumper switch 233 is coupled to the ground.

Further, as illustrated in FIG. 8, a third terminal of the jumper switch 233 is labeled hook on/off signal and is coupled to a first terminal of a resistor 235 (100 k ohms) and a first terminal of a resistor 234 (100 k ohms). A second terminal of the resistor 234 is coupled to the ground. A second terminal of the resistor 235 is coupled to a base terminal of an npn transistor 237 (2N4401). An emitter terminal of the transistor 237 is coupled to the ground. A collector terminal of the transistor 237 is coupled to a first terminal of a resistor 236 (100 k ohms), a input terminal of an inverter 238, and an input terminal of an inverter 262. A second terminal of the resistor 236 is coupled to 10 volts dc. An output terminal of the inverter 238 is coupled to an input terminal of an inverter 239. An output terminal of the inverter 239 is coupled to a first terminal of a resistor 240 (10 k ohms). A second terminal of the resistor 240 is coupled to a collector terminal of an npn transistor 249 (2N4401) and a first terminal of a capacitor 241.

An emitter terminal of the transistor 249 is coupled to the ground. A base terminal of the transistor 249 is coupled to a first terminal of a resistor 250. A second terminal of the capacitor 241 is coupled to a first terminal of a resistor 242 and an input terminal of an inverter 245. A second terminal of the resistor 242 is coupled to the ground. An output terminal of the inverter 245 is coupled to pin 8 of the a chip 247 (LM556CM) which is the trigger terminal. Pin 12 (threshold) and pin 13 of the chip 247 are coupled to a first terminal of a resistor 243 (412 k ohms), a first terminal of a capacitor 294 (1 μF), and a first terminal of a capacitor 244 (2.2 μF). A second terminal of the resistor 243 is coupled to 10 volts dc. Each second terminal of the capacitor 294 and the capacitor 244 is coupled to the ground. Pin 10 of the chip 247 is coupled to 10 volts dc, and pin 11 is coupled to a first terminal of the capacitor 246. A second terminal of the capacitor 246 is coupled to the ground. Pin 9 (output) of the chip 247 is coupled to an anode terminal of a diode 248 (1N4148). An output terminal of the inverter 262 is coupled to a first terminal of the resistor 261. A second terminal of the resistor 261 is coupled to a first terminal of the capacitor 257 and a collector terminal of an npn transistor 259 (2N4401). A base terminal of the transistor 259 is coupled to a first terminal of a resistor 258, and an emitter terminal of the transistor 259 is coupled to the ground. A second terminal of the capacitor 257 is coupled to an input terminal of an inverter 253 and a first terminal of a resistor 256. A second terminal of the resistor 256 is coupled to the ground. An output terminal of the inverter 253 is coupled to pin 6 of the chip 252 (LM556CM). Pins 1 and 2 of the chip 252 are coupled to a first terminal of a capacitor 955 (1 μF), a first terminal of a capacitor 255 (2.2 μF), and a first terminal of a resistor 254 (332 k ohms). Each second terminal of the capacitor 295 and the capacitor 255 is coupled to the ground. A second terminal of the resistor 254 is coupled to 10 volts dc. Pin 4 of the chip 252 is coupled to 10 volts dc. Pin 3 of the chip 252 is coupled to the first terminal of a capacitor 251. A second terminal of the capacitor 251 is coupled to the ground.

A first terminal of a resistor 263 (1M ohm) is coupled to 10 volts dc. A second terminal of the resistor 263 is coupled to an input terminal of an inverter 264 and a first terminal of a capacitor 265 (2.2 μF). A second terminal of the capacitor 265 is coupled to the ground. An output terminal of the inverter 264 is coupled to an anode terminal of a diode 260 (1N4148) and a first terminal of a resistor 266 (47 k ohms). A second terminal of the resistor 266 is coupled to a base terminal of an npn transistor 267 (2N4401). An emitter terminal of the transistor 267 is coupled to the ground. A collector terminal of the transistor 267 is coupled to a base terminal of an npn transistor 270 (2N4401) and a first terminal of a resistor 271 (220 ohms). A second terminal of the resistor 271 is coupled to a second terminal of the resistor 250 and a first terminal of a resistor 281 (1 k ohm). A cathode terminal of the diode 260 is coupled to a second terminal of the resistor 258, a cathode terminal of the diode 248, a first terminal of a resistor 268 (220 ohms), and a first terminal of a resistor 277 (1 k ohm).

A second terminal of the resistor 268 is coupled to a base terminal of an npn transistor 269 (2N4401). A second terminal of the resistor 281 is coupled to a base terminal of an npn transistor 280 (2N4401). A second terminal of the resistor 277 is coupled to a base terminal of an npn transistor 278 (2N4401). A collector terminal of the transistors 269 and 270 are coupled to an emitter terminal of an npn transistor 287. An emitter terminal of the transistor 269 is coupled to a first terminal of a resistor 272 (1 k ohm), pin 1 of a jumper 274, and a collector terminal of the transistor 280. An emitter terminal of the transistor 270 is coupled to a first terminal of a capacitor 273 (0.1 $\mu$F), pin 2 of the jumper 274, and a collector terminal of the transistor 278. A second terminal of the resistor 272 is coupled to a second terminal of the capacitor 273. Emitter terminals of the transistors 278 and 280 are coupled to a first terminal of a resistor 279 (0 ohms). A second terminal of the resistor 279 is coupled to the ground.

A base terminal of the transistor 287 is coupled to a first terminal of a resistor 288 (1 k ohm). A second terminal of the resistor 288 is coupled to a first terminal of a potentiometer 289 (1 k ohm). A second terminal of the potentiometer 289 is coupled to a first terminal of a resistor 290 (560 ohms). A second terminal of the resistor 290 is coupled to the ground. A third terminal of the potentiometer 289 is coupled to the voltage VCC. A collector terminal of the transistor 287 is coupled to an unregulated 12 volt voltage supply.

Pin 3 of a chip 283 (LM317-LZ) is coupled to a first terminal of a capacitor 282 and 12 volts of unregulated dc. Pin 1 of the chip 283 is coupled to a first terminal of a resistor 284 (1.5 k ohms) and a first terminal of a resistor 285 (220 ohms. Pin 2 of the chip 283 is coupled to 8.8 volts dc, a positive terminal of a capacitor 286 (1 $\mu$F), and a second terminal of the resistor 285. A second terminal of the capacitor 282, a second terminal of the resistor 284, and a negative terminal of the capacitor 286 are coupled to the ground.

Figure 9:
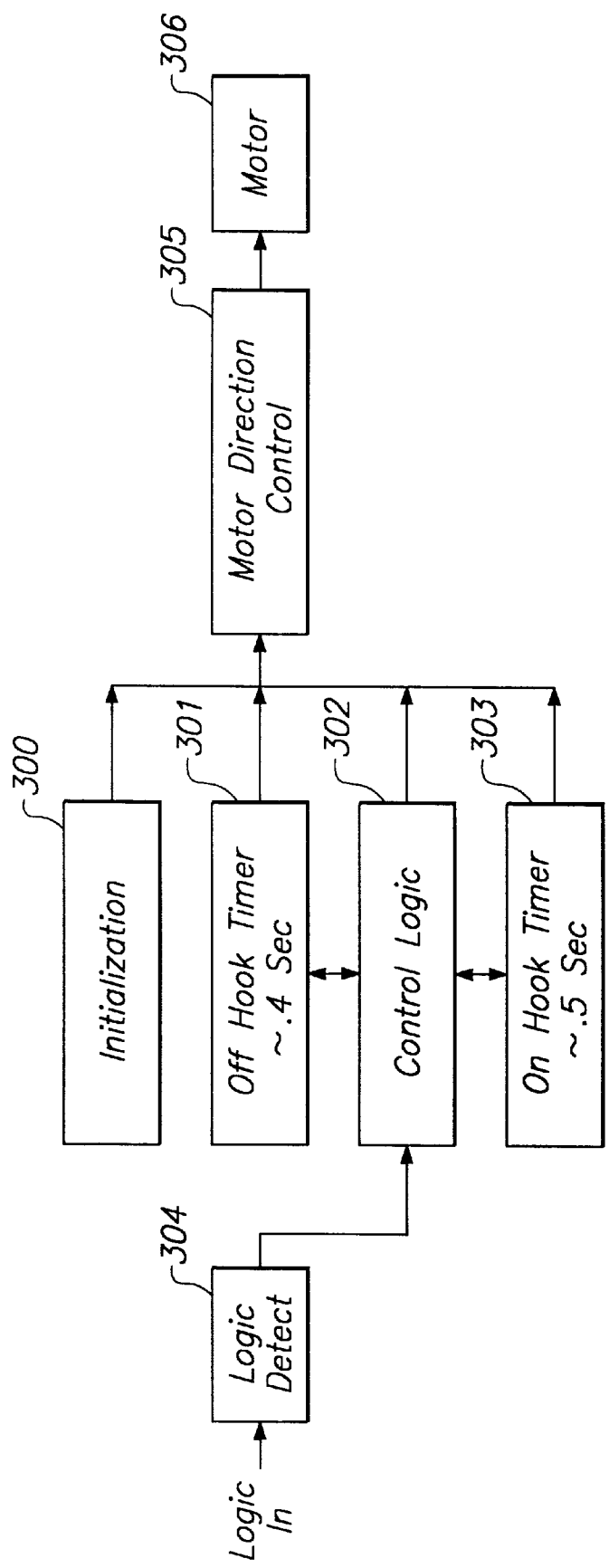
FIG. 9 illustrates a block diagram for the present invention.

FIG. 9 illustrates a block diagram for the present invention. The block 300 contains the initialization sequence which occurs upon powering up the present invention. The block 304 receives the incoming logic and provides logic detection. Upon detecting the logic, the block 304 sends the detected logic to the block 302. The block 302 processes the logic and either activates the block 301 (Off Hook Timer) or the block 303 (On Hook Timer). Both of the blocks 301 and 303 provide the block 305 with the appropriate motor direction and the appropriate predetermined amount of time the motor is activated. In order to ensure that the telephone handset fully returns to the on-hook position, the block 303 activates the motor for a longer time duration than the block 301. The block 306 receives the direction and time duration for the proper operation.

A commercial device embodying the present invention is being developed and is anticipated that it will be introduced during the first quarter of 1997 by Hello Direct, Inc. It is configured to cooperate with an improved version of the cordless headset of FIG. 1. In particular, haedset 400 FIG. 10 receiver circuit will activate upon removal from the charging cradle. With the microphone boom 406 in the up position, all other circuits of the headset 400 remain inactive to conserve the battery.

Upon detection of an incoming call as a result of a ringing signal, the device of the present invention will communicate the ringing condition to the headset base unit 404 which in turn will provide an appropriate signal to the receiver circuit of the headset 400. The headset 400 will provide an audible signal to the user via the ear piece 402. If the user decides to answer the incoming call, the microphone boom 406 will be lowered. That action will activate the remaining circuits of the headset 400 and cause the headset 400 to generate a pick-up signal which is communicated to the headset base unit 404 and then to the device of the present invention which will raise the handset in response.

Upon termination of a call, the user will raise the microphone boom 406. This action deactivates all circuits of the headset 400 except the receiver circuit and concurrently transmits a hang-up signal to the headset base unit 404. The hang-up signal is communicated to the present invention to lower the telephone handset onto the cradle and take the telephone on hook, thereby. This remote notification and two-way communication allows a user to receive and terminate calls from a location remote from their telephone set.

Returning to FIG. 6, the clutch band 22 found inside the clutch housing 21, transfers the energy created by the motor 27 to the handset arm 15 such that the handset arm can be raised and lowered. The clutch band 22 also prevents the motor 27, as well as the parts coupled to the motor 27, such as the handset arm 15, the handset shaft 16, and the drive shaft 18 from becoming over-stressed. Without the clutch band 22 to prevent excessive force, the additional time the motor is activated in the on-hook direction relative to the off-hook direction could cause damage to the motor 27 and to the parts coupled to the motor 27. Additionally, the clutch band 22 also safeguards against possible damage to the motor 27 and its coupled parts while operating in the off-hook direction when there is an unexpected obstacle in the path of the handset arm 15, the handset shaft 16, or the drive shaft 18.

Proper alignment of the handset to the lift-arm 19 when the handset is lifted is maintained by adjusting the amount of time during which the motor 27 lifts the handset in a minimum. Preferably, the height above the cradle to which the handset is lifted is thereby minimized to that which is just sufficient to reliably activate the hook switch of the telephone. Otherwise, as the handset is lifted higher than necessary, it is more likely to slip or shift relative to the handset arm 15. To further prevent such slipping, the handset arm 15 is preferably covered with a anti-slip padding, such as rubber or foam rubber.

In addition, because the telephone set rests upon the platform 17 which is coupled to the handset arm 15 by the pedestal 12 and the handset shaft 16, a unitary structure for the telephone set and handset pick-up device is provided. This unitary structure aids in maintaining proper alignment of the handset to the cradle by preventing the forces associated with lifting the handset from forcing the pick-up device out alignment with the handset and with the telephone cradle. As the handset is gently lowered over the hook switch, the motor 27 drives the handset arm 15 downward beyond a point at which the handset is expected to be lowered into the cradle to ensure that the telephone is reliably placed on-hook, while the clutch 22 limits the amount of force that can be applied to the telephone set.

Because a unitary structure for the telephone set and handset pick-up device is provided by resting the telephone set on the platform 17, proper alignment of the handset to the cradle is maintained by preventing the forces associated with the clutch 22 slipping after the lift-arm 19 contacts the telephone from forcing the pick-up device out alignment. Accordingly, the clutch 22 provides sufficient force to gently and reliably raise and lower the telephone handset without causing misalignment between the handset and the cradle of the telephone resting on the platform 17 and without causing damage to the handset, the hook switch or to the telephone set.

The motor control portion of the circuits, in FIGS. 6 and 7, control the pick up and hang up of the telephone handset via the motor 27 and the appropriate structure in the base unit. While taking into account the height adjustable pot 26 of FIG. 6, the motor control circuit adjusts the amount of time the motor 27 operates in the pick up direction to accommodate different pick up heights that are characteristic to various corded telephones. Further, to ensure that the handset is fully on the hook after the call is complete, the motor control circuit operates the motor 27 in the on-hook direction for a slightly longer duration tanm in the off-hook direction. Preferably, this longer time duration is 115% of the time during which the motor 27 is activated to lift the handset.

The microphone pre-amplification circuit found in FIG. 8 amplifies and filters out specific frequencies that are received from the contact microphone 200. The pre-amplification circuit prevents extraneous noises from providing erroneous ring signals to the base unit of the present invention. Additionally, the pre-amplification circuit must also provide the correct notification of the ring signals from the corded telephone. Because the present invention is designed to operate with a variety of corded telephones from different manufacturers each with possibly different characteristic ring signals, the pre-amplification circuit must correctly sense a variety of ring signals.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. For example, specific values are given to capacitors and resistors which are only to facilitate the understanding of the principles of construction and operation of the invention. It will be apparent to those skilled in the art that modifications may be made in the embodiment chosen for illustration without departing from the spirit and scope of the invention.

We claim:

1. A universal lift mechanism for a telephone handset comprising:
    i. a generally rectangular base configured to support a telephone and having means for adjusting a size of the base to accommodate telephones of varying sizes;
    ii. a tower mounted to the base and positioned near a corner of the base;
    iii. a lifting arm rotatably mounted to the tower at a substantially horizontal axis of rotation, the lifting arm including a lifting member that is substantially parallel to the axis and further including means to adjust a length of the lifting arm to accommodate telephones of varying configurations;
    iv. means for rotating the axis to rotate the lifting arm at the axis such that the lifting member remains substantially parallel to the axis for lifting a telephone handset; and
    v. means for adjusting a start and stop position for the axis to accommodate telephones of varying configurations.

2. The universal lift mechanism according to claim 1 wherein the means for rotating the axis comprises a motor.

3. The universal lift mechanism according to claim 1 wherein the means for adjusting a start and stop position comprises a control circuit.

4. The universal lift mechanism according to claim 1 further comprising a base transceiver for communicating with a headset operatively coupled to a corresponding headset transceiver.

5. The universal lift mechanism according to claim 4 wherein the universal lift mechanism can be made to selectively lift and lower the telephone handset remotely by using an activation circuit coupled to the headset.

6. The universal lift mechanism according to claim 5 further comprising a sensor in the base for detecting a ringing condition in the telephone and means for signaling a user of the ringing condition.

7. A universal lift mechanism for a telephone handset comprising:
    a. a generally rectangular base configured to support a telephone wherein the base is configured to have adjustable dimensions for accommodating telephones of varying sizes;
    b. a tower mounted to the base and positioned near a corner of the base, the tower including a rotating means having axis of rotation that is substantially horizontal and motor for turning the rotating means;
    c. a control circuit for controlling the motor to drive the rotating means;
    d. a lifting arm rotatably coupled to the rotating means, the lifting arm including a lifting member that is substantially parallel to the axis and further including means to adjust a length of the lifting arm to accommodate telephones of varying configurations;
    e. a first communications transceiver coupled to the base;
    f. a remote second communications transceiver for communicating with the first communications transceiver and for providing a user with audio signals received from the base via the communications transceivers and for receiving audio signals from the user for transmission to the base; and
    g. means for adjusting a start and stop position for the axis to accommodate telephones of varying configurations.

8. The universal lift mechanism according to claim 7 wherein the means for adjusting a start and stop position comprises a control circuit.

9. The universal lift mechanism according to claim further comprising a base transceiver for communicating with a headset operatively coupled to a corresponding headset transceiver.

10. The universal lift mechanism according to claim 9 wherein the universal lift mechanism can be made to selectively lift and lower the telephone handset remotely by using an activation circuit coupled to the headset.

11. The universal lift mechanism according to claim 10 further comprising a sensor in the base for detecting a ringing condition in the telephone and means for signaling a user of the ringing condition.

12. A universal lift mechanism for a telephone handset comprising:
   a. a base configured to support a telephone and having means for adjusting a size of the base to accommodate telephones of varying sizes;
   b. a tower mounted to the base;
   c. a lifting arm rotatably mounted to the tower at a substantially horizontal axis of rotation, the lifting arm including a lifting member that is substantially parallel to the axis and further including means to adjust a length of the lifting arm to accommodate telephones of varying configurations;
   d. means for rotating the axis to rotate the lifting arm at the axis such that the lifting member remains substantially parallel to the axis for lifting a telephone handset; and
   means for adjusting a start and stop position for the axis to accommodate telephones of varying configurations.

13. The universal lift mechanism according to claim 12 wherein the means for rotating the axis comprises a motor.

14. The universal lift mechanism according to claim 12 wherein the means for adjusting a start and stop position comprises a control circuit.

15. The universal lift mechanism according to claim 12 further comprising a base transceiver for communicating with a headset operatively coupled to a corresponding headset transceiver.

16. The universal lift mechanism according to claim 15 wherein the universal lift mechanism can be made to selectively lift and lower the telephone handset remotely by using an activation circuit coupled to the headset.

17. The universal lift mechanism according to claim 16 further comprising a sensor in the base for detecting a ringing condition in the telephone and means for signaling a user of the ringing condition.

18. A universal lift mechanism for a telephone handset comprising:
   a. a base configured to support a telephone wherein the base is configured to have adjustable dimensions for accommodating telephones of varying sizes;
   b. a tower mounted to the base, the tower including a rotating means having an axis of rotation that is substantially horizontal and motor for turning the rotating means;
   c. a control circuit for controlling the motor to drive the rotating means;
   d. a lifting arm rotatably coupled to the rotating means, the lifting arm including a lifting member that is substantially parallel to the axis and further including means to adjust a length of the lifting arm to accommodate telephones of varying configurations;
   e. a first communications transceiver mounted to the base;
   f. a remote second communications transceiver for communicating with the first communications transceiver and for providing a user with audio signals received from the base via the communications transceivers and for receiving audio signals from the user for transmission to the base; and
   g. means for adjusting a start and stop position for the axis to accommodate telephones of varying configurations.

19. The universal lift mechanism according to claim 18 wherein the means for adjusting a start and stop position comprises a control circuit.

20. The universal lift mechanism according to claim 19 wherein the control circuit is configured to control the motor to raise the handset for a first preselected distance in response to a signal indicating that the telephone is to be placed in an off-hook condition and wherein the motor control circuit controls the motor to attempt to lower the handset for a second preselected distance in response to a signal indicating that the telephone to be placed in an on-hook condition wherein the second preselected distance is longer than the first preselected distance.

21. The universal lift mechanism according to claim 20 further comprising means for preventing the motor from lowering the lifting arm a distance sufficient to cause damage to the telephone.

22. The universal lift mechanism according to claim 18 further comprising a base transceiver for communicating with a headset operatively coupled to a corresponding headset transceiver.

23. The universal lift mechanism according to claim 22 wherein the universal lift mechanism can be made to selectively lift and lower the telephone handset remotely by using an activation circuit coupled to the headset.

24. The universal lift mechanism according to claim 23 further comprising a sensor in the base for detecting a ringing condition in the telephone and means for signaling a user of the ringing condition.

25. A device for controlling a hook switch of a telephone having a handset, the device comprising:
   a. a platform for accommodating the telephone;
   b. a motor coupled to the platform;
   c. a lifter means coupled to receive energy from the motor wherein the lifter means is positioned to raise the handset in response to the motor driving the handset upward and to lower the handset in response to the motor driving the handset downward and wherein an amount of force that can be applied to the lifter means by the motor is selectively limited, and
   d. a motor control circuit coupled for controlling the motor, wherein the motor control circuit controls the motor to raise the handset for a first preselected distance in response to a signal indicating that the telephone is to be placed in an off-hook condition and wherein the motor control circuit controls the motor to attempt to lower the handset for a second preselected distance in response to a signal indicating that the telephone is to be placed in an on-hook condition wherein the second preselected distance is longer than the first preselected distance.

26. A device for controlling a hook switch of a telephone having a handset, the device comprising:
   a. a platform for accommodating the telephone;
   b. a motor coupled to the platform;
   c. a control circuit coupled for controlling the motor;
   d. a lift-arm assembly coupled to receive energy from the motor wherein the lift-arm assembly is positioned to raise and lower the handset using a rotational motion, the lift-arm assembly raises and lowers the handset according to a motor control signal generated by the control circuit; and
   e. means for limiting a travel distance of the lift-arm assembly.

27. The device according to claim 26 wherein the control circuit controls the motor to raise the handset for a first preselected distance in response to a signal indicating that the telephone is to be placed in an off-hook condition and wherein the motor control circuit controls the motor to attempt to lower the handset for a second preselected distance in response to a signal indicating that the telephone to be placed in an on-hook condition, wherein the means for limiting a travel distance prevents the handset and correspondingly the lift-arm assembly from moving the second distance.

28. The device according to claim 27 wherein the control circuit controls the motor to raise the handset for a first preselected distance by operating the motor for a first preselected time and wherein the motor control circuit controls the motor to attempt to lower the handset for a second preselected distance by operating the motor for a second preselected time, wherein the second preselected time is longer than the first preselected time.

\* \* \* \* \*

UNITED STATES PATENT AND TRADEMARK OFFICE
CERTIFICATE OF CORRECTION

PATENT NO. : 6,285,759 B1
DATED : September 4, 2001
INVENTOR(S) : Cummings (formerly Britto) et al.

It is certified that error appears in the above-identified patent and that said Letters Patent is hereby corrected as shown below:

Title page,
Under heading (12), delete "Britto" and replace with -- Cummings --.
Under heading (75), delete "Britto" and replace with -- Cummings --.

Column 2,
Line 27, delete "off-hook The" and replace with -- off-hook. The --.

Column 3,
Line 19, delete "arivn-" and replace with -- an on- --.

Column 5,
Line 54, delete "(10 k ohns)" and replace with -- (10 k ohms) --.

Column 6,
Line 5, delete "(10 k olms)" and replace with -- (10 k ohms) --.
Line 25, delete "tristors" and replace with -- transistors --.
Line 47, delete "transsor" and replace with -- transistor --.

Column 7,
Line 35, delete "cresistor" and replace with -- resistor --.

Column 8,
Line 61, delete "of the" and replace with -- of the --.

Figure 10:
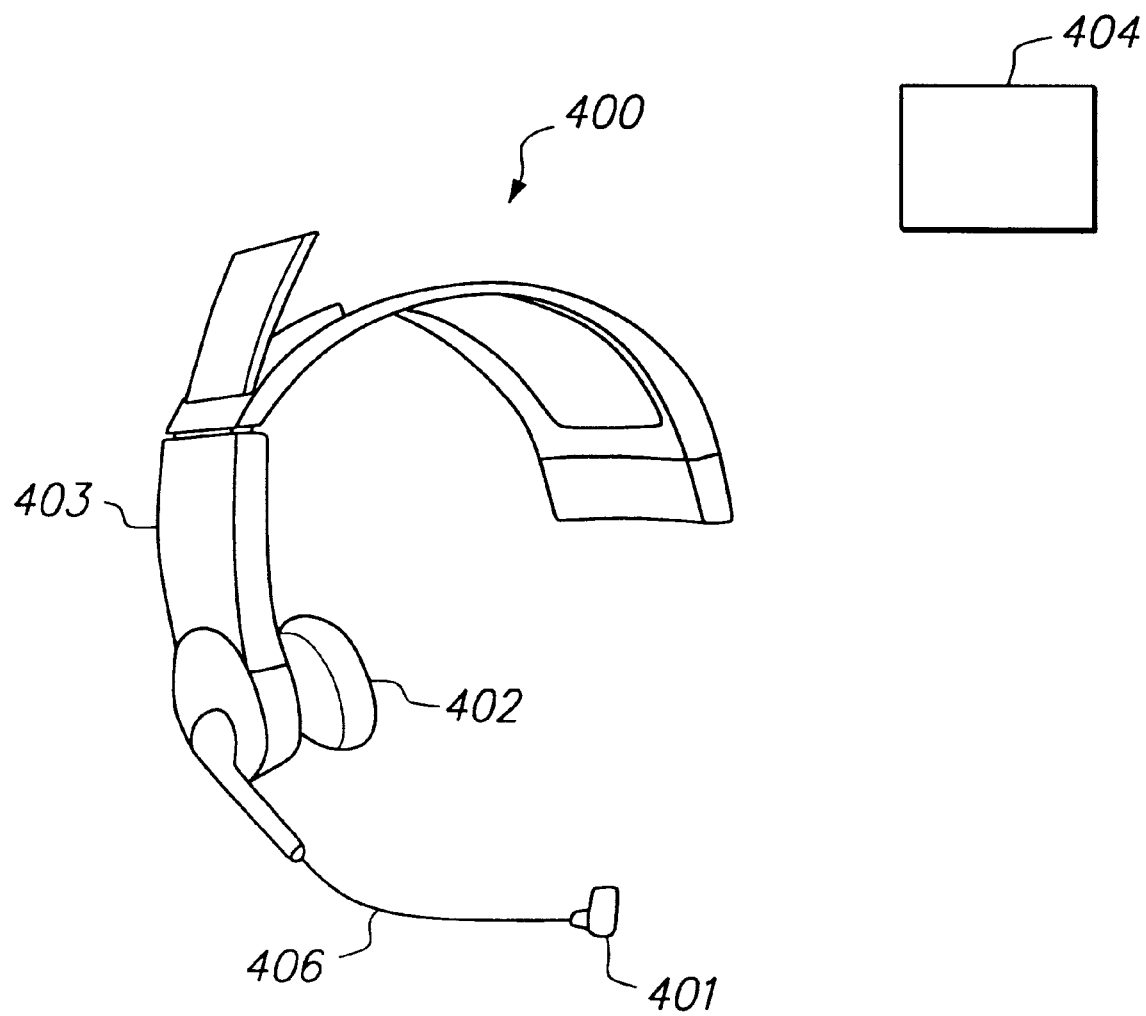
FIG. 10 shows a schematic representation of a headset and controller according to the present invention.

Column 9,
Line 67, delete "In particular, haedset 400 FIG. 10" and replace with -- In FIG. 10, the --.

Column 10,
Line 1, after the words "receiver circuit", insert -- of the cordless headset 400 --.

Column 11,
Line 23, delete "tanm" and replace with -- than --.

UNITED STATES PATENT AND TRADEMARK OFFICE
CERTIFICATE OF CORRECTION

PATENT NO. : 6,285,759 B1
DATED : September 4, 2001
INVENTOR(S) : Cummings (formerly Britto) et al.

It is certified that error appears in the above-identified patent and that said Letters Patent is hereby corrected as shown below:

Column 12,
Line 62, insert -- 7 -- between the words "claim" and "further".

Signed and Sealed this

Twelfth Day of March, 2002

Attest:

Attesting Officer

JAMES E. ROGAN
Director of the United States Patent and Trademark Office